RECORDING OF FACSIMILE SIGNALS

Filed June 19, 1968

United States Patent Office 3,536,403
Patented Oct. 27, 1970

3,536,403
RECORDING OF FACSIMILE SIGNALS
Harry Strickholm, Dumont, N.J., assignor to Litton Systems, Inc., Beverly Hills, Calif., a corporation of Maryland
Filed June 19, 1968, Ser. No. 738,167
Int. Cl. G03b *27/58*
U.S. Cl. 355—47 6 Claims

ABSTRACT OF THE DISCLOSURE

A facsimile recorder for recording a screened copy on a light-sensitive medium, such as photographic film. The film is adapted for use in photogravure printing processes without employing the separate screen ordinarily used in preparing a half-tone cut. A variable-density aperture is provided in the recorder optical system to vary the size of the recorded spots or dots with changes in the picture signals.

BACKGROUND OF THE INVENTION

Field of the invention

The invention relates to the preparation of a sheet or film to be used in making a half-tone cut in response to electrical facsimile signals.

Description of the prior art

It has been proposed to prepare a screened copy from picture signals by employing a special recording lamp of the glow discharge type, wherein the size of "glowing spot" varies with changes in the applied voltage or current (U.S. patent to Michael Schmierer, No. 2,002,551 dated May 28, 1935). Besides the complexity of this arrangement and the possibility of undesired changes in the lamp characteristics due to aging, it does not permit adjustment of the screen resolution to match the resolution requirements of the copy.

SUMMARY

The light from the recording lamp is projected onto the film through an aperture, either fixed or rotatable, which has its transmission density varying from a minimum at the center to a predetermined maximum at the periphery. The optical system may permit adjustment of the resolution of the screen.

DESCRIPTION OF THE PREFERRED EMBODIMENTS

Figures 1, 2:
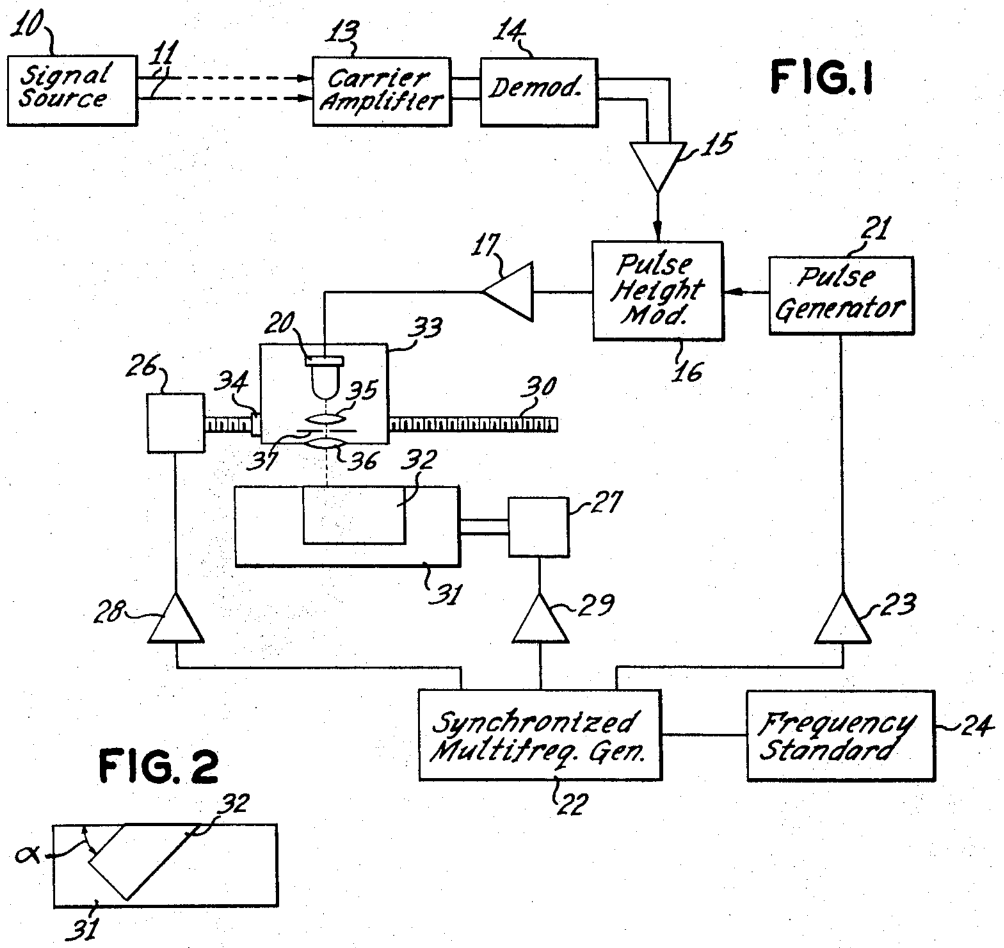
FIG. 1 is an overall block diagram of a facsimile recording system embodying the invention.
FIG. 2 is a view showing the recording film mounted at an angle to the direction of scanning.

Referring to the drawing, the facsimile recording system shown in FIG. 1 reproduces the transmitted picture in a form in which different levels of gray are represented in terms of variations in the diameter of small black dots arranged in a fixed pattern. Thus the reproduction is the equivalent of the "screened" film commonly used in the half-tone printing process, and the requirement for the use of a screen with its attendant disadvantages is avoided.

As shown by way of example, the picture signals are generated by a transmitter or signal source 10 and applied to the line 11 connecting transmitter and receiver. The amplitude modulated carrier is amplified by amplifier 13 and demodulated by a demodulator 14 to separate the modulating signal. The picture signal or video signal is further amplified by an amplifier 15, as shown, and impressed upon the pulse height modulator 16. The modulator 16 has two inputs to synchronize the output pulses with the operation of the facsimile recorder, as will be explained. The output pulses from the modulator 16 are amplified at 17 and impressed upon the recorder lamp 20. The lamp 20 is of the glow modulator type, and may be the conventional crater lamp having a hollow cathode producing a light output proportionate to the applied signal current. The lamp responds to the signal pulses to generate light pulses of corresponding intensity.

A pulse generator 21 is connected to the modulator 16 to produce a train of pulses modulated by the video signal. The uniformly spaced gating pulses from generator 21 are thus varied in amplitude to correspond to the changes in amplitude of the picture signals and impressed upon the recorder. The pulse generator 21 is connected to a multifrequency generator 22 through the isolation amplifier 23. The generator 22 is controlled by a constant frequency source such as a frequency standard 24 which is effective to synchronize the recording pulses with the operation of the facsimile recorder and maintain the recorder in synchronism with the remote transmitter 10. As shown the recorder may consist of synchronous motors 26 and 27 which are energized by the multifrequency generator 22 through current amplifiers 28 and 29, respectively. The motor 26 rotates the lead screw 30 of the recorder and the motor 27 rotates the copy drum or cylinder 31 on which the light-sensitive film 32 is mounted. Thus the scanning rate and line feed of the recorder are synchronized with the operation of the pulse generator 21 so that the recording signals are timed to effect uniform spacing or predetermined spacing of the elemental recording areas on the film 32. The recorded picture signals are in the form of spaced dots, normally equally spaced apart by synchronizing the pulse generator 21 with the speed of the drum and line feed motors 26 and 27.

The recorder lamp 20 is mounted in an optical system on a carriage 33 provided with the usual feed nut 34 engaging the lead screw 30. The optical system consists of a condensing lens 35, an objective lens 36 and an aperture plate 37 disposed adjacent the drum surface of the recorder 31. The condensing lens 35 projects an image of the light source or crater in the lamp 20 onto the mounting plane of the objective lens 36. The lens may be of the varifocal or "zoom" type as will be explained in connection with FIG. 6.

Figure 4:
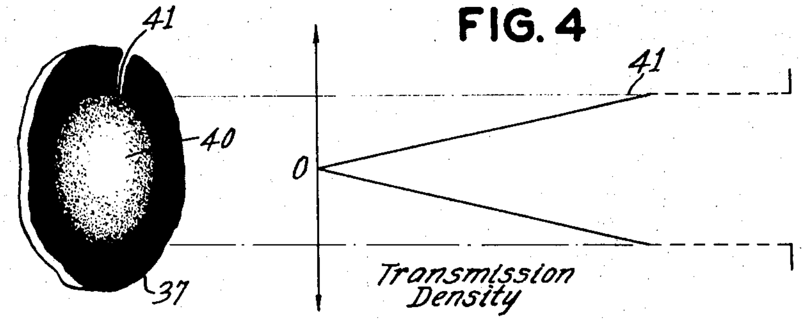
FIG. 4 is a view to an enlarged scale of the aperture and a graph illustrating the variation in transmission density thereof.
Figure 3:
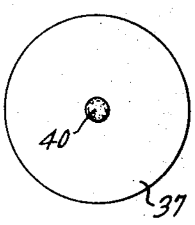
FIG. 3 is a plan view of one form of aperture plate.
Figure 5:
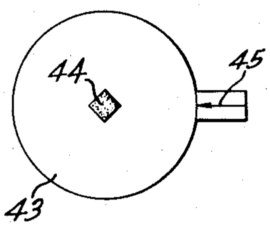
FIG. 5 shows a modified form of aperture plate.

The aperture plate 37, shown in detail in FIGS. 3, 4, and 5, is mounted in front of the condensing lens 35. As shown in FIGS. 3 and 4, the aperture plate 37 consists of an opaque disc provided with a hole or aperture 40 which has a variable transmission density varying uniformly from a minmum at the center to a predetermined maximum out at the edge 41. A chart of a typical density variation is shown in FIG. 4 with the axis of the chart corresponding with the center of the aperture 40. In this illustration, the transmission density starts ideally at zero density at the center and increases linearly to a maximum determined by the nature of the film used for recording the picture signals. Beyond the edge 41 of the aperture, the transmission density is infiinte since no light is transmitted through the peripheral portion of the aperture plate 37.

The aperture in the aperture plate 37 may be round as shown in FIG. 3, square as shown in FIG. 5 or hexagonal or other shape suitable for use in the printing process. Changing the shape of the dots on the printing medium when desired is much easier than with conventional screen processes since care must be exercised only in the manufacture of a single variable density aperture instead of forming the thousands of rulings or dots required in the conventional screen printing technique. A square aperture 44 shown by way of example on aperture plate 43 in FIG. 5 may be rotatable to change the orientation of the dot as recorded on the film, a fixed indexing mark 45 being provided if desired.

The aperture plate according to the invention attenuates the picture signals so that a low level pulses from the pulse height modulator 16 is only sufficient to expose the film 32 at the center of the aperture, thus forming small dots on the film when processed. As the level of the signal pulses increases the lamp brightness increases so that more light passes through the variable density aperture 40 at a further radius from the center. This light intensity is above the threshold of exposure to the film at a slightly larger radius and produces a latent image on the film which will develop out as a slightly larger dot. Thus the size of the dot recorded for each signal pulse will vary with the signal level. While the portion of the film which is aligned with the center of the crater lamp output will receive greater exposure than the edge, by developing the film for a saturation density in terms of its latent image characteristics, the over-exposure at the center of the dot will produce an image no darker at the center than at the edge of the dot. In this manner the film 32 when developed will be a reproduction of the transmitted picture in which the gray tones are formed of dots of varying size depending upon the shading of any particular area, and the film may be used in the regular way to make a screen cut for printing newspaper or magazine pictures or the like by the conventional photogravure process.

In color printing processes using color separation negatives, the screen axis is tilted to different angles. As shown in FIG. 2, the mounting of the copy 32 on the drum may be lanted at an angle $\alpha$ in recording a color separation negative. For this purpose the adjustable aperture 43 may be employed either with a square aperture or any other desired aperture shape. The tilting of the screen axis in normal color printing is to avoid objectionable moire effects where the dot structures in certain areas overlay each other. While certain angles have been used and standardized by the printing industry to provide a desirable reproduction, the adjustable aperture 43 would not be rotated to the standard angle traditionally used in screen printing but is rather determined by the necessity for the ratio between each of the synchronizing frequencies to be expressed in some whole number or close approximation thereof, which may be readily generated by the multifrequency generator 22. By selecting certain compatible ratios between the lead screw feed, the drum speed, and the pulse generation rate, we can skew the film at some intermediate angle so that the consequent law of the screen axis on the film 32 is the same as that produced in the ordinary screen printing technique.

Figure 6:
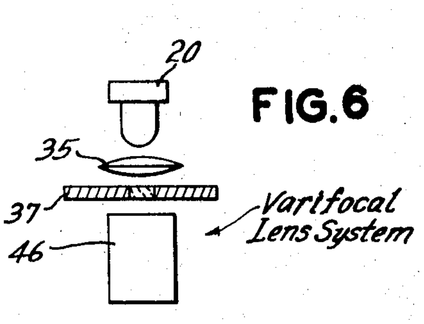
FIG. 6 shows a modified optical system.

Instead of using an optical system having a fixed focus as shown in FIG. 1, the objective lens may be of the varifocal or "zoom" type as shown at 46 in FIG. 6, to permit the reduction ratio from aperture to film to be adjusted to meet different resolution requirements. A single aperture 37 may then be used for a range of screen recording such as from 65 to 300 lines. This adjustability feature permits the resolution of the screen to be made to match the resolution requirements of the final copy with the bandwidth limits of channel 11 and the available transmission time for sending the copy.

The signal recording apparatus and technique embodying the invention have important advantages in the printing art. The use of a screen, or a separate screen for each color separation negative, is avoided while the system can be readily readjusted for different resolution requirements. Furthermore, the transmission of pictures by conventional facsimile apparatus, where half-tone pictures or photographs are sent, requires a screening resolution much higher than the dot spacing of the film in order to detect the smallest dot in the photograph representing the lightest shade of gray. For example these dots may be one or two thousandths of an inch in diameter. A coarse 65 line screen has dots of this size as well as of all intermediate sizes. In order to transmit the small dots a scanning resolution of the order of 500 to 1,000 lines per inch is required. This is approximately 9 to 15 times greater than the resolution of the 65-line picture. With the improved technique described above in which the picture density of the elemental area is converted into dots on the film, facsimile scanning at 65 lines per inch can be used at the transmitter or signal source. The saving in transmission time by this method varies as the square of the conventional resolution required divided by the square of the screen resolution. For newsprint work this ratio would most likely be $300^2/65^2=34$, representing a significant saving in the time for transmission of the picture without sacrificing fidelity of reproduction.

The variable density aperture plate can be readily made by photographic methods which would reduce a hand-drawn or similar representation of the aperture to a diameter of, say, one-quarter of an inch or any other desired size. The aperture plate is of durable construction and does not change in light transmitting characteristics during use, and different aperture plates may be substituted in the recorder for different screen or printing requirements.

Several different embodiments of the invention have been shown and described in detail for the purpose of explaining the underlying principles thereof, which may be embodied in other apparatus. By way of example and not of limitation, the signal source 10 may be located adjacent to the recorder instead of being connected through a long line circuit or channel as indicated. Various conventional methods of synchrnoizing the picture signal pulses with the scanning function of the recorder may be employed and the lead screw 30 may be geared to the drive mechanism for the drum 31 so that a single motor is used for driving both the drum and the lead screw. The means shown for optically scanning the film is similar to a common form of facsimile recorder except for the optical system per se and various other suitable scanning arrangements may be substituted for that shown.

What is claimed is:

1. In facsimile recording apparatus for exposing a film in accordance with picture signals, in combination:
   - a modulatable recording lamp,
   - a source of picture signals,
   - means including said source for energizing said lamp,
   - means including said lamp for exposing successive elemental areas of said film in accordance with the variations in the light intensity of said lamp, and
   - means defining an aperture between said lamp and said film, said aperture varying in opacity in different areas to vary the effective exposure of the film in each elemental area thereof depending upon the concurrent light intensity of said lamp.

2. Facsimile recording apparatus according to claim 1, in which the transmission density of said aperture is a minimum at the center of the aperture and increases gradually toward the edge of the aperture, to effect recording of dots of varying sizes in the elemental areas of the film.

3. Facsimile recording apparatus according to claim 1, in which a varifocal or "zoom" lens is employed to focus the light beam from said aperture on said film.

4. Facsimile recording apparatus according to claim 2, in which the aperture is substantially circular.

5. Facsimile recording apparatus according to claim 2, in which the aperture is substantially square.

6. Facsimile recording apparatus according to claim 1, in which the picture signals applied to the recorder lamp are in the form of pulses, and means are provided to synchronize said pulses with the scanning movement of the film being recorded.

References Cited

UNITED STATES PATENTS

| | | | |
|---|---|---|---|
| 2,002,551 | 5/1935 | Schmierer | 313—209 |
| 3,318,186 | 5/1967 | Bobbe et al. | 355—67 |

NORTON ANSHER, Primary Examiner

D. J. CLEMENT, Assistant Examiner

U.S. Cl. X.R.

355—67, 69